United States Patent [19]

Koshio

[11] Patent Number: 4,671,140
[45] Date of Patent: Jun. 9, 1987

[54] CONTROL FOR STEPLESSLY VARIABLE TRANSMISSION

[75] Inventor: Tomoaki Koshio, Hiroshima, Japan

[73] Assignee: Mazda Motor Corporation, Hiroshima, Japan

[21] Appl. No.: 635,584

[22] Filed: Jul. 30, 1984

[30] Foreign Application Priority Data

Jul. 30, 1983 [JP] Japan .................................. 58-140154

[51] Int. Cl.⁴ ............................................ B60K 41/14
[52] U.S. Cl. ........................................ 74/868; 74/865; 474/18
[58] Field of Search .................. 74/861, 862, 865, 867, 74/868; 474/18, 28

[56] References Cited

U.S. PATENT DOCUMENTS

| 3,043,152 | 7/1962 | Karig et al. ............................ 474/18 |
| 3,052,132 | 9/1962 | Dittrich et al. ......................... 474/18 |
| 3,200,666 | 8/1965 | Schrodt et al. ........................ 474/18 |
| 3,552,235 | 1/1971 | Szodfridt ............................... 74/865 |
| 3,893,344 | 7/1975 | Dantlgraber et al. ............. 474/28 X |
| 4,094,203 | 6/1978 | van Deursen et al. ................ 474/28 |
| 4,161,894 | 7/1979 | Giacosa ................................. 74/863 |
| 4,185,521 | 1/1980 | Beals ..................................... 74/865 |
| 4,369,675 | 1/1983 | van Deursen ........................ 74/864 |
| 4,400,164 | 8/1983 | Cadee ............................... 74/867 X |
| 4,467,674 | 8/1984 | van Deursen et al. ................ 74/867 |
| 4,515,041 | 5/1985 | Frank et al. ....................... 74/865 X |
| 4,519,790 | 5/1985 | Yamamuro et al. .............. 474/28 X |
| 4,534,243 | 8/1985 | Yokoyama et al. ............... 474/28 X |
| 4,596,528 | 8/1971 | Dittrich et al. ................... 74/865 X |

FOREIGN PATENT DOCUMENTS

| 2752322 | 6/1978 | Fed. Rep. of Germany ........ 474/18 |
| 173653 | 10/1982 | Japan ..................................... 474/28 |
| 102857 | 6/1983 | Japan ..................................... 474/28 |

Primary Examiner—Leslie Braun
Assistant Examiner—Joseph M. Rolnicki
Attorney, Agent, or Firm—Fleit, Jacobson, Cohn & Price

[57] ABSTRACT

A belt type steplessly variable transmission includes a belt-pulley device of variable speed ratio and a fluid pressure operated actuator for changing the speed ratio of the belt-pulley device. A fluid control valve is provided for controlling a supply of fluid pressure to the actuator to thereby determine the speed ratio of the belt-pulley device. The fluid control valve is associated including with a manually operable member movable between a first position in which it does not affect operation of the fluid control valve and a second position in which the supply of fluid pressure is changed so that a change in the speed ratio does not take place until input speed to the belt-pulley device exceeds a predetermined value. A manually operable valve is provided for changing the supply of fluid pressure so that the speed ratio of the belt-pulley means is increased.

2 Claims, 4 Drawing Figures

CONTROL FOR STEPLESSLY VARIABLE TRANSMISSION

The present invention relates to steplessly variable transmissions for automobiles and more particularly to belt type stepless transmissions. More particularly, the present invention pertains to a speed ratio control for such transmissions.

Conventionally known steplessly variable transmissions include those of a belt type which include a primary and secondary pulley assemblies both having variable effective diameters and connected together by means of an endless belt. In recent years, efforts are being made to use this type of transmissions in automobiles. Belt type stepless transmissions developed for automobile use generally include actuators for adjustably changing the effective diameters of the pulley assemblies and hydraulic control systems for controlling supplies of hydraulic fluid to the actuators. The hydraulic control systems function to control the operations of the actuators in accordance with the engine operating conditions so that desired speed ratios are obtained between the primary and secondary pulley assemblies. More specifically, the speed ratio is changed in accordance with the engine speed and the engine load which may be detected in terms of the engine throttle valve position. In a conventional manner of the speed ratio control, the speed ratio defined as a ratio of the speed of the primary pulley assembly to that of the secondary pulley assembly is decreased in response to an increase in the engine speed but increased in response to an increase in the engine throttle valve opening. With this control, when it is desired to accelerate the vehicle from a medium throttle valve opening, the speed ratio is gradually decreased while the engine speed is not sufficiently increased so that a desired accelerating effort cannot be obtained. Further, when the engine throttle valve is closed for down-hill operation, the speed ratio of the transmission does not increase to a satisfactory level until the engine speed is decreased to a level corresponding to the closed throttle valve position so that it is difficult to obtain an engine brake effect.

In view of the above problems, the U.S. Pat. No. 4,369,675 issued to P. H. van Deursen on Jan. 25, 1983 proposes a control system for a belt type stepless transmission in which the pulley assemblies are maintained at a position of maxium speed ratio under a low engine speed range. In the proposed system, there is provided a control valve which includes a valve spool applied at one end with a hydraulic pressure corresponding to the engine speed and at the other end with a spring force which corresponds to the engine throttle valve position so that the spool is axially moved in a direction of decreasing the speed ratio by the hydraulic pressure as the engine speed increases and in the opposite direction by the spring force as the throttle valve opening increases. The system is further provided with a manually operated lever mechanism which functions when operated to increase the spring force applied to the other end of the spool under an engine speed lower than a predetermined value so that the pulley assemblies are maintained at the position of maximum speed ratio until the engine speed increases beyond the predetermined value. With the proposed system, a large speed ratio is maintained in acceleration until the engine speed is increased beyond the predetermined value so that a satisfactory accelerating rate can be obtained. Further, when the engine throttle valve is closed for a down-hill operation, the speed ratio is increased to a maximum value as soon as the engine speed is decreased to the predetermined value so that a significant engine brake effect can be obtained.

It should however be noted that the proposed system is not perfectly satisfactory because the manually operated lever mechanism is effective only in the low engine speed range wherein the engine speed is lower than the predetermined value. Therefore, there still remain problems of insufficient accelerating efforts and of insufficient engine brake effects.

It is therefore an object of the present invention to provide a control system for a belt type stepless transmission, in which the speed ratio can be increased throughout the operating range when desired.

Another object of the present invention is to provide a control system for a belt type transmission, which includes manually operated means for maintaining a relatively high speed ratio for acceleration and deceleration.

Accoring to the present invention, the above and other objects can be accomplished by a belt type steplessly variable transmission comprising belt-pulley means of variable speed ratio, fluid pressure operated actuator means for changing speed ratio of said belt-pulley means, fluid control means for controlling a supply of fluid pressure to said actuator means to thereby determine the speed ratio of said belt-pulley means, said fluid control means including manually operable means for controlling the fluid pressure supply so that the speed ratio of the belt-pulley means is increased when manually operated. In a preferable mode of the present invention, the fluid control means includes second manually operable means for controlling the fluid pressure supply to thereby maintain the belt-pulley means at a position of maximum speed ratio under the input speed lower than a predetermined value.

According to a more specific aspect of the present invention, there is provided a belt type steplessly variable transmission comprising belt-pulley means including a primary pulley assembly having a variable effective diameter, a secondary pulley assembly having a variable effective diameter and endless belt means passed around and extending between said primary and secondary pulley assemblies; hydraulic actuator means for determining the effective diameters of said primary and secondary pulley assemblies to thereby determine speed ratio of the belt-pulley means; control valve means for controlling hydraulic fluid supply to said hydraulic actuator means, said control valve means including a movable valve member for controlling a flow of hydraulic fluid to said hydraulic actuator means, first means for biasing said valve member in one direction with a force which increases in response to an increase in speed of said primary pulley assembly and second means for biasing said valve member in the opposite direction with a force which increases in response to an increase in load driven by the belt-pulley means, whereby the hydraulic fluid is supplied to said hydraulic actuator means so that the speed ratio of said belt-pulley means is decreased in response to an increase in the speed of said primary pulley assembly and increased in response to an increase in said load; speed ratio shifting means adapted to be brought into operation by manually operable means for applying an additional biasing force to said valve member in said opposite direction so that the speed ratio of said belt-pulley means is increased throughout an operating range of said belt-pulley means. The control valve means may be provided with means which is also brought into operation by said manually operable means for increasing the force applied to said valve member by said second means when the speed of said primary pulley means is below a predetermined value so that the belt-pulley means is maintained at a position of maximum speed ratio until the speed of said primary pulley means is increased beyond the predetermined value.

The above and other objects and features of the present invention will become apparent from the following descriptions of a preferred embodiment taking reference to the accompanying drawings, in which.

Figure 1:
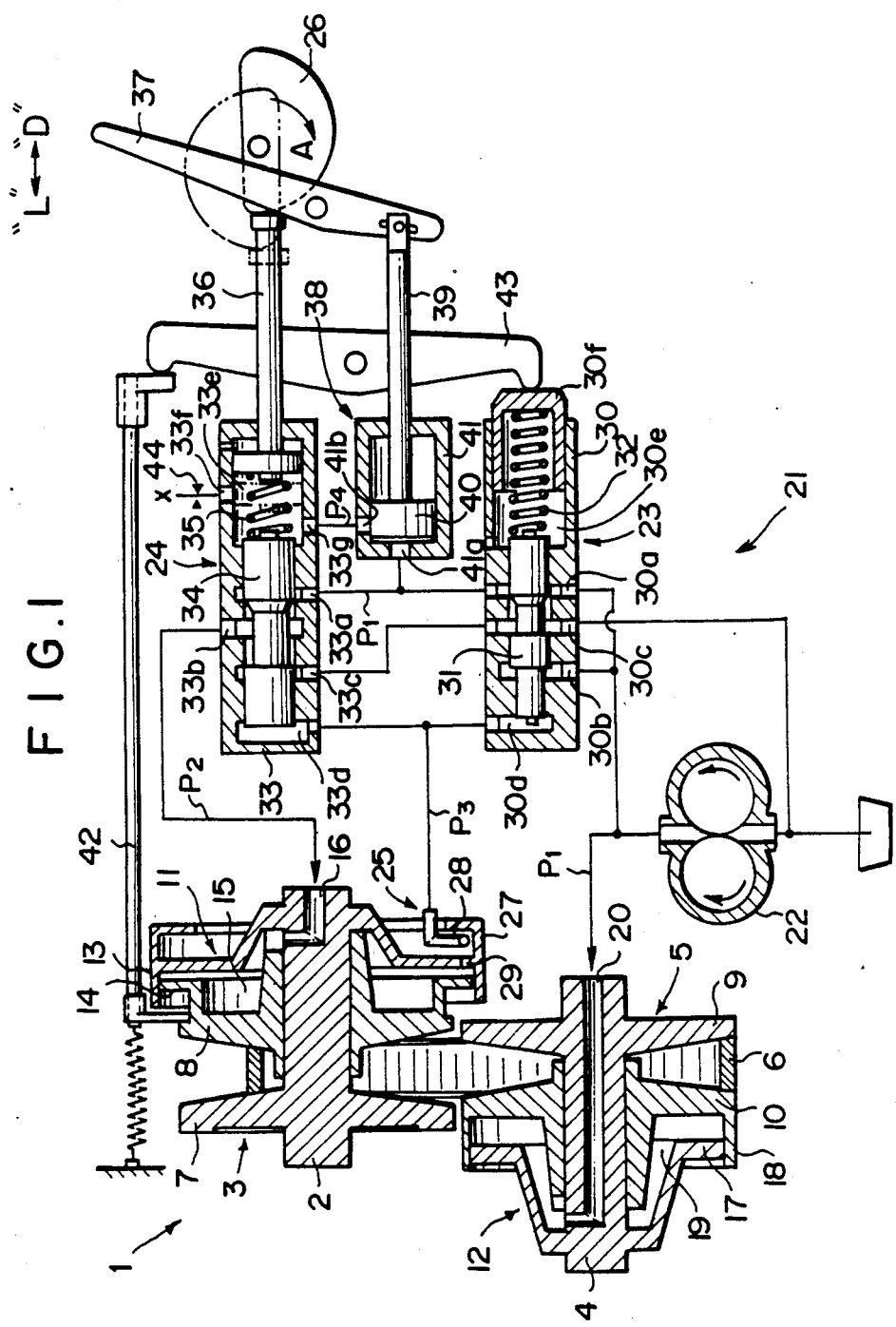
FIG. 1 is a sectional view of a belt-pulley type stepless transmission with a speed ratio control system in accordance with one embodiment of the present invention.

Referring to the drawings, particularly to FIG. 1, there is shown a steplessly variable transmission 1 including an input shaft 2 provided with a primary pulley assembly 3 of variable effective diameter and an output shaft 4 provided with a secondary pulley assembly 5, an endless V-belt 6 being stretched between said primary and secondary pulley assemblies 3 and 5. The primary pulley assembly 3 includes a stationary disc 7 which is integral with or secured to the input shaft 2 and a movable disc 8 which is mounted on the input shaft 2 for axial slidable movement so as to confront to the stationary disc 7. The discs 7 and 8 have confronting surfaces which are of frustoconical configurations so that a groove of substantially conical cross-section is defined between the discs 7 and 8 for engagement with the belt 6. The secondary pulley 5 includes a stationary disc 9 integral with or secured to the output shaft 4 and a movable disc 10 mounted on the output shaft 4 for axial slidable movement so as to confront to the stationary disc 9. The discs 9 and 10 have confronting surfaces defining a groove of substantially conical cross-section for engagement with the belt 6.

Where the belt 6 engages the primary pulley assembly 3 at the minimum diameter position as shown in FIG. 1, it engages the secondary pulley assembly 5 at the maximum diameter position to establish a maximum or largest speed ratio. Similarly, where the belt 6 engages the primary pulley assembly 3 at the maximum diameter position, it engages the secondary pulley assembly 5 at the minimum diameter position to establish a minimum or smallest speed ratio.

The primary pulley assembly 3 is provided with a hydraulic actuator 11 for controlling the axial position of the movable disc 8 on the input shaft 2. The actuator 11 includes a cylinder 13 secured to the input shaft 2 and a piston 14 fitted to the cylinder 13 to define a pressure chamber 15 in the cylinder 13. The piston 14 is secured to the movable disc 8 to move therewith. In the input shaft 2, there is formed a fluid passage 16 which opens to the pressure chamber 15. Similarly, the secondary pulley assembly 5 is provided with an actuator 12 which includes a cylinder 18 integrally formed with the movable disc 10 and a piston 17 secured to the output shaft 4 and fitted to the cylinder 18 to define a pressure chamber 19. The output shaft 4 is formed with a passage 20 which leads to the pressure chamber 19.

A hydraulic fluid control system 21 is provided for controlling the supply of hydraulic fluid to the actuators 11 and 12 to thereby determine the effective diameters of the pulley assemblies 3 and 5. The control system 21 includes a pump 22 driven by an engine not shown for generating a hydraulic fluid pressure. The pump 22 has an output connected with a pressure regulating valve 23 which functions to regulate the output pressure of the pump 22 and produce a regulated pressure $P_1$.

The pressure regulating valve 23 has a casing 30 formed with an axial bore and a spool 31 axially slidably received in the axial bore. The casing 30 is formed with a main port 30a, a pressure modifying port 30b and a drain port 30c located between the ports 30a and 30b. At an end of the casing 30 adjacent to the port 30b, there is formed a speed pressure chamber 30d and, at the other end, there is a cylindrical spring chamber 30e. The outlet port of the pump 22 is connected with the main port 30a and the pressure modifying port 30b, whereas the drain port 30c is connected with a hydraulic fluid reservoir.

The primary pulley assembly 3 is provided with a speed detecting device 25 which includes a drum 27 formed integrally with the cylinder 13 of the actuator 11. The inside of the drum is connected at the peripheral portion with the pressure chamber 15 through a passage 29 so that hydraulic fluid is introduced into the drum 27 from the pressure chamber 15. In the drum 27, there is built up a pressure which is proportional to the rotating speed of the primary pulley assembly 3. A speed pressure pick-up tube 28 is provided to pick-up the pressure built up in the drum 27 as a speed pressure $P_3$.

The speed pressure $P_3$ from the pick-up tube 28 is introduced into the speed pressure chamber 30d to force the spool 31 rightward as seen in the plane of FIG. 1. In the axial bore of the casing 30, there is defined a restricted passage between the main port 30a and the drain port 30c, the area of the restricted passage being determined by the axial position of the spool 31. More specifically, the area of the restricted passage increases as the spool 31 moves rightward to thereby increase the drain of hydraulic fluid from the main port 30a to the drain port 30c. It should however be noted that the output pressure of the hydraulic pump 22 increases as the engine speed increases so that the regulated pressure $P_1$ at the main port 30a is increased in response to an increase in the engine speed although the speed pressure $P_3$ increases and tends to increase the area of the restricted passage between the ports 30a and 30c.

In the spring chamber 30e, there is a spring 32 which functions to force the spool 31 leftward against the speed pressure $P_3$ in the chamber 30d. In the spring chamber 30e, there is an end cap 30f which is axially slidable and supports the free end of the spring 32. The end cap 30f can be slidably moved to change the force of the spring 32 for the purpose which will be described later. The spool 31 has a land facing to the pressure modifying port 30b so that the pressure from the pump 22 is applied to the plunger 31 to force it rightward. Therefore, the axial position of the spool 31 is determined by the balance of the rightward biasing force as applied by the speed pressure $P_3$ at the chamber 30d and the pump pressure at the port 30b, and the leftward biasing force applied by the spring 32, to thereby regulate the pump pressure to the regulated line pressure $P_1$.

The control system further includes a control valve 24 which includes a casing 33 formed with an axial bore which receives a spool 34 for axial slidable movement. The casing 33 has an inlet port 33a which is connected with the main port 30a of the pressure regulating valve 23 so that the regulated pressure $P_1$ is introduced therein. The casing 33 is further formed with an outlet port 33b which is connected with the passage 16 in the input shaft 2 and a drain port 33c located at a side opposite to the inlet port 33a with respect to the outlet port 33b. The axial bore of the casing 33 is formed at an end adjacent to the drain port 33c with a speed pressure chamber 33d which is connected with the pick-up tube 28 so that the speed pressure $P_3$ is introduced therein. At the opposite end, the casing 33 is formed with a spring chamber 33e in which a spring 35 is disposed. The spring 35 is engaged at one end with the right hand end of the spool 34 and at the other end with a spring adjusting member 36 of which axial position is determined by a load cam 26. The load cam 26 is connected for example with an engine throttle valve so that its position represents the load driven by the transmission.

The spool 34 is so formed that the inlet port 33a is opened to the outlet port 33b when the spool 34 is shifted toward right but opened to the drain port 33c when the spool 34 is shifted toward left. Thus, it will be understood that the pressure $P_2$ at the outlet port 33b is determined in accordance with the speed of the engine or the primary pulley assembly 3 and the load on the engine. Speaking more specifically, an increase in the speed tends to increase the pressure $P_2$ whereas an increase in the load tends to decrease the pressure $P_2$. An increase in the pressure $P_2$ causes a movement of the disc 8 toward the disc 7 resulting in an increase in the effective diameter of the primary pulley assembly 3. This will automatically result in a decrease in the effective diameter of the secondary pulley assembly 5 to thereby decrease the speed ratio.

The outlet of the pump 22 is also connected with the passage 20 formed in the output shaft 4 so that the line pressure $P_1$ is introduced into the pressure chamber 19 of the actuator 12. The pressure in the chamber 19 serves to force the movable disc 10 toward the stationary disc 9 to maintain the tension in the belt 6.

In order to detect the speed ratio in terms of the axial position of the movable disc 8, there is provided a disc position detecting rod 42. A swingable lever 43 having a pivot point at an intermediate portion thereof is engaged at one end with the rod 42 and at the other end with the end cap 30f of the pressure regulating valve 23. When the movable disc 8 is shifted toward right to increase the speed ratio, the lever 43 is swung clockwise so that the end cap 30f is moved toward left to compress the spring 32. This will cause an increase in the line pressure $P_1$ It will therefore be understood that the tension in the belt 6 can be adjusted in accordance with the speed ratio, that is, the torque transmitted through the transmission so that the tension is increased as the torque increases.

Figure 2:
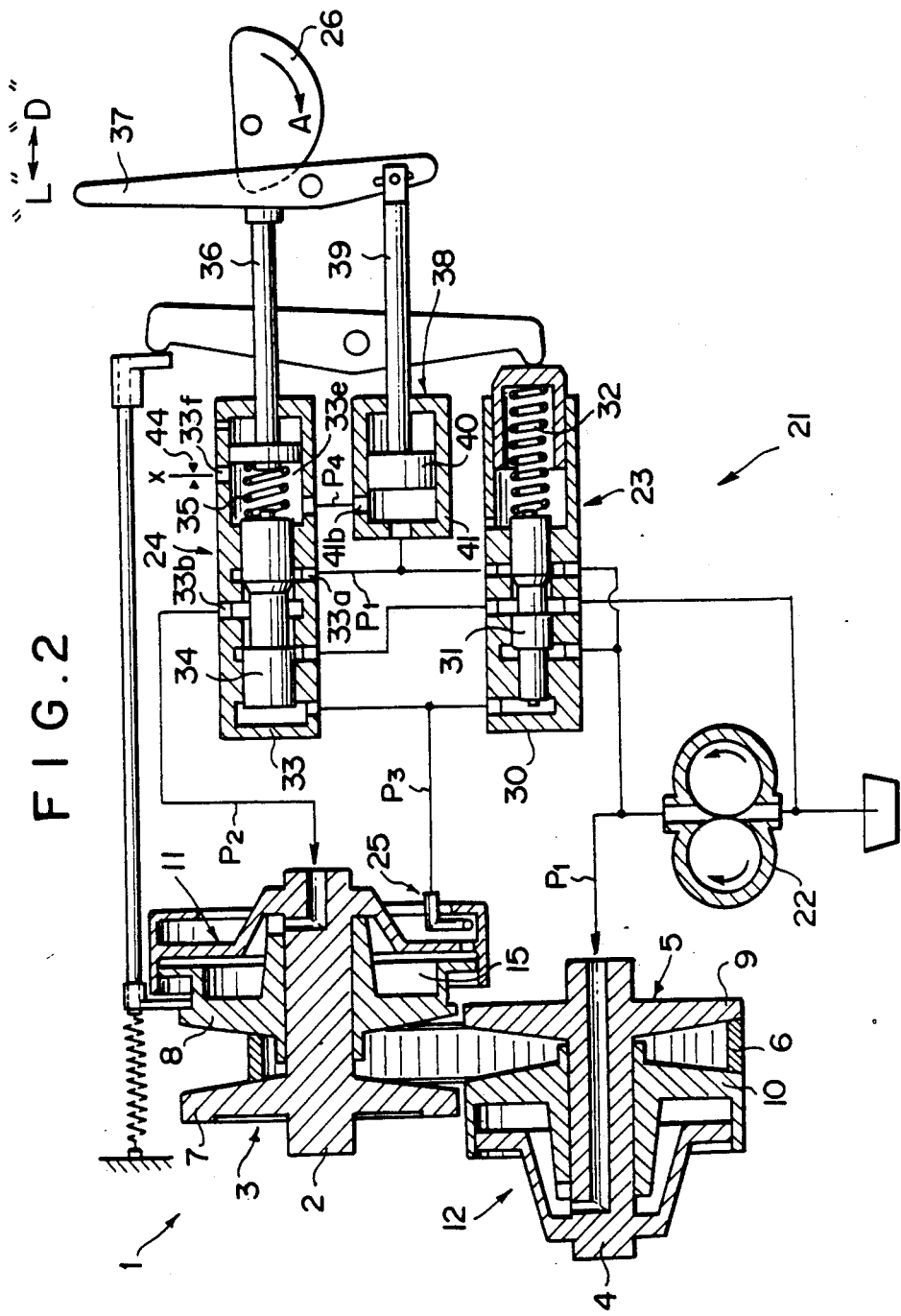
FIG. 2 is a sectional view similar to FIG. 1 but showing a position wherein the manual lever is operated.

The control system is further provided with a speed ratio shifting device which includes a manual lever 37 and a shift valve 38. The manual lever 37 is pivotably mounted adjacent to the load cam 26 and movable between a "D" position as shown in FIG. 1 and an "L" position as shown in FIG. 2. In the D position shown in FIG. 1, the lever 37 is out of engagement with the spring adjusting member 36 so that the position of the member 36 is controlled only by the load cam 26. However, in the L position, the lever 37 moves the member 36 toward left by a predetermined distance so that the compression force of the spring 35 is increased by an extent that the spool 34 is maintained at the extreme left position until the speed pressure in the chamber 33d is increased beyond a predetermined value. Thus, as long as the speed pressure is below the predetermined value, the pressure in the chamber 15 of the actuator 11 is released and the primary pulley assembly 3 is maintained at the minimum effective diameter position. Therefore, the transmission is held at the maximum speed ratio. When the speed pressure increases beyond the predetermined value in response to an increase in the speed of the primary pulley assembly 3, the spool 34 is shifted toward right and a control pressure $P_2$ is established at the outlet port 33b of the valve 24. Further, as the load cam 26 is rotated in the direction of an arrow A in response to an increase in the engine load, the cam 26 engages the spring adjusting member 36 so that the control pressure $P_2$ is thereafter determined in accordance with the engine load and the engine speed in the same manner as in the case wherein the lever 37 is positioned in the D position. The shift valve 38 includes a casing 41 and a spool 40 received in the casing 41. The casing 41 is formed at one end with an inlet port 41a which 40 is connected with the main port 30a of the pressure regulating valve 23. The casing 41 is further formed at a side portion with an outlet port 41b. The spool is connected through a rod 39 with the lever 37 so that it is operated by the lever 37 in such a manner that the port 41b is disconnected from the port 41a when the lever 37 is in the D position but connected with the port 41a when the lever 37 is in the L position.

The casing 33 of the control valve 24 is formed with an inlet port 33g opening to the spring chamber 33e and connected with the outlet port 41b of the shift valve 38. The casing 33 further has an outlet port 33f opening to the spring chamber 33e and connected through an orifice 44 to the reservoir. Thus, it will be understood that, when the lever 37 is in the L position, a pressure $P_4$ is built up in the spring chamber 33e so that the control pressure $P_2$ is correspondingly decreased to thereby increase the speed ratio.

It will be understood from the above descriptions that, when the manual lever 37 is in the D position as shown in FIG. 1, the position of the spool 34 in the control valve 24 is determined by the speed pressure $P_3$ in the chamber 33d and the compression force of the spring 35 which is determined by the position of the load cam 26. Thus, the control pressure $P_2$ and therefore the speed ratio of the transmission is determined in accordance with the speed and the load of the engine driving the primary pulley assembly 3. At this time, the tension of the belt 6 is determined in accordance with the speed ratio or the torque transmitted by the transmission.

Figure 3:
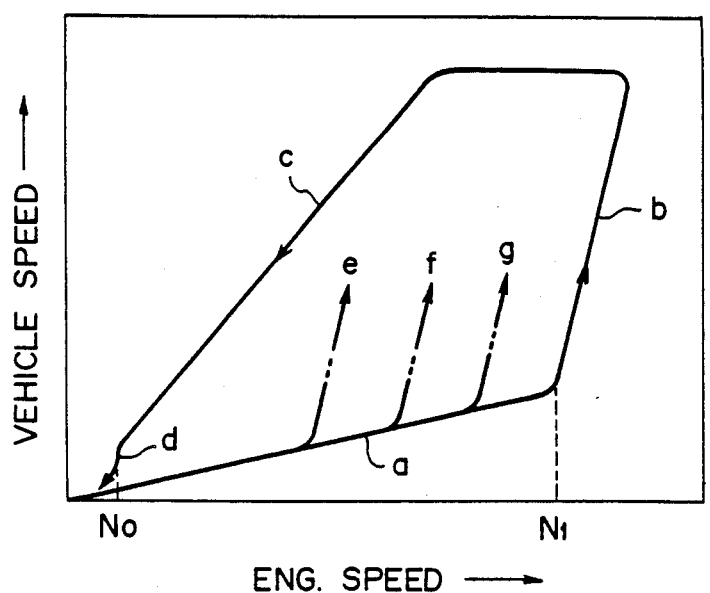
FIG. 3 is a diagram showing the operating characteristics under the operating condition shown in FIG. 1; and, FIG. 4 is a digram similar to FIG. 3 but under the operating condition shown in FIG. 2.

When it is assumed that the engine throttle valve is wide open for acceleration, the speed pressure $P_3$ increases in response to an increase in the engine speed so that the rightward biasing force on the spool 34 increases. However, since the load cam 26 is rotated for example to the position shown by a phantom line in FIG. 1 to compress the spring 35, the spool 34 cannot be shifted rightward so that the primary pulley assembly 3 is maintained at the minimum effective diameter position. Therefore, the engine speed increases at a high rate as shown by a line a in FIG. 3. When the engine speed increases to a value $N_1$ wherein the speed pressure overcomes the spring 35, the spool 34 is shifted toward right so that a control pressure $P_2$ is built up to decrease the speed ratio. Therefore, engine load is increased and the increase in the engine speed becomes slow but the vehicle speed is in turn increased at a faster rate as shown by a line b in FIG. 3.

In deceleration, the load cam 26 is returned to the position shown by a solid line in FIG. 1 so that the compression force of the spring 35 is weakened. Therefore, the spool 34 is maintained at the rightwardly shifted position to hold the transmission at a lower speed ratio. Therefore, engine speed is decreased at a relatively high rate and the vehicle speed is decreased at a relatively slower rate as shown by a line C in FIG. 3. As the engine speed decreases to a value comparable with the weak force of the spring 35, the spool 34 is returned toward left so that the speed ratio of the transmission is increased to give a rapid deceleration of the vehicle as shown by a line d in FIG. 3 to an idling engine speed No.

The engine speed $N_1$ at which the speed ratio starts to decrease in acceleration is dependent on the opening of the engine throttle valve. Therefore, the change in the speed ratio of the transmission and thus a rapid vehicle acceleration will start at a different engine speed as shown by lines e, f and g in FIG. 3.

When the lever 37 is moved to the L position as shown in FIG. 2, the spring adjusting member 36 is shifted leftward by the lever 37 so that the pressure in the pressure chamber 15 of the actuator 11 is released as long as the engine speed is below the predetermined value to maintain the transmission at the maximum speed ratio. At the same time, the pressure $P_4$ is built up in the spring chamber 33e of the control valve 24 so that the force of the spring 35 is assisted by the pressure $P_4$.

Figure 4:
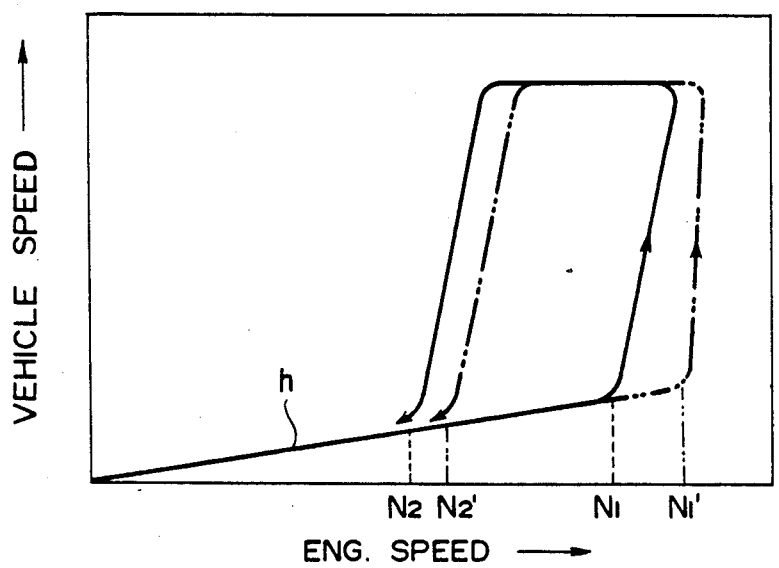

In this position of the lever 37, the spool 34 is held at the extreme left position to maintain the transmission at the maximum speed ratio as long as the engine speed is low. Therefore, the engine speed is increased at a high rate as shown by a line h in FIG. 4. When the engine speed increases to a value $N_{1'}$ with the throttle valve wide open, the speed pressure $P_3$ overcomes the force of the spring 35 and the pressure $P_4$ so that a control pressure $P_2$ is built up. Thus, the speed ratio is changed and the vehicle speed is rapidly increased. The speed $N_{1'}$ is larger than the speed $N_1$ at which the change in the speed ratio starts with the lever 37 in the "D" position.

With the "L" position of the lever 37, the load cam 26 is disengaged from the spring adjusting member 36 as long as the engine throttle valve opening is smaller than a predetermined value since the rotating angle of the load cam 26 is small. Thus, the transmission is maintained at the maximum speed ratio position until the engine speed increases to a value $N_{2'}$ which is larger than the speed $N_2$ at which the change in the speed ratio starts with the lever 37 in the "D" position. Since the line pressure $P_1$ increases in response to an increase in the engine speed, the pressure $P_4$ also increases in response to an increase in the engine speed. Therefore, the biasing force applied to the spool 34 of the control valve 24 is increased as the engine speed increases. It will thus be understood that the difference between the engine speeds $N_{1'}$ and $N_1$ is larger than the difference between the engine speed $N_{2'}$ and $N_2$ so that it is possible to expand in the "L" position of the lever 37 the region wherein the speed ratio change takes place.

The invention has thus been shown and described with reference to a specific embodiment, however, it should be noted that the invention is in no way limited to the details of the illustrated structures but changes and modifications may be made without departing from the scope of the appended claims.

I claim:

1. A belt type steplessly variable transmission comprising belt-pulley means of variable speed ratio, fluid pressure operated actuator means for changing the speed ratio of said belt-pulley means, fluid control means for controlling a supply of fluid pressure to said actuator means to thereby determine the speed ratio of said belt-pulley means, said fluid control means including control valve means comprising a movable valve member having one end applied with a control signal pressure which changes in accordance with input speed of said belt-pulley means, spring means at the other end of said valve member for applying to said valve member a spring force which changes in accordance with a load on said belt-pulley means, and manually operable means for controlling the fluid pressure supply so that the speed ratio of the belt-pulley means is increased when manually operated, said manually operable means including first means for applying a mechanical preset force to said spring means, and second means for applying a hydraulic force to the valve member to assist said spring means in forcing the valve member.

2. A transmission in accordance with claim 1 in which said second means includes means for changing the hydraulic force in accordance with the input speed of said belt-pulley means.

* * * * *